3,314,277
COLD FORMING OF ASYMMETRIC ARTICLES
John Edward Hopkins, Coggeshall, Essex, and Dennis Richard Wilson, Wollaton, Nottingham, England, assignors to Raleigh Industries Limited, a company of the Queen of Great Britain, Northern Ireland and The Isle of Man
Filed Feb. 4, 1963, Ser. No. 255,877
Claims priority, application Great Britain, Feb. 3, 1962, 4,249/62
1 Claim. (Cl. 72—375)

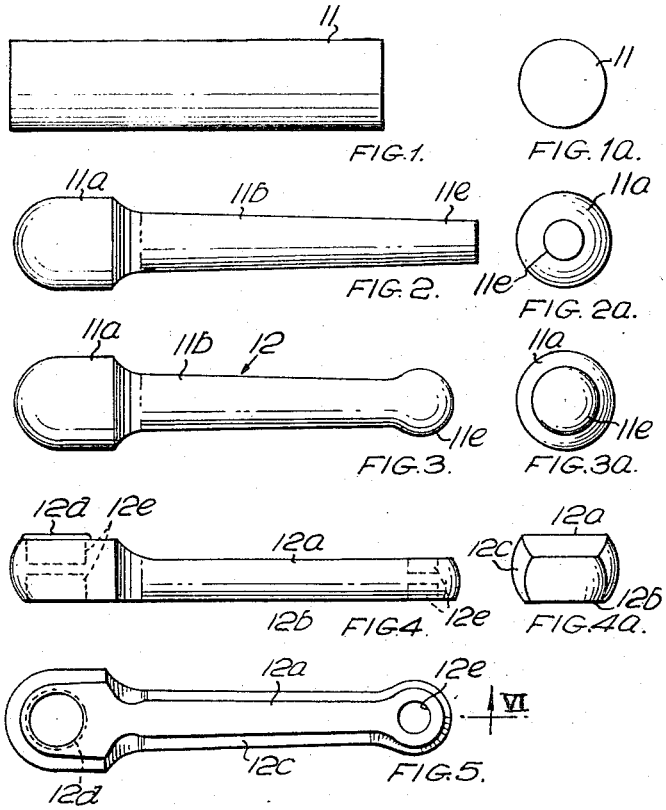

The invention concerns the cold forming of asymmetric and other articles and has particular, though not exclusive, reference to the cold forming of bicycle cranks.

When producing a bicycle pedal crank by conventional methods it is usual for a considerable degree of machining to be required in order to reduce the article to its finished shape and dimensions. The machining operations are expensive for at least two reasons. Firstly, the operations are time consuming and thus costly in labour. Secondly a considerable quantity of material is removed from an initial blank to give an end product of the requisite form and such removal represents an appreciable wastage of materials.

It is among the objects of the present invention to provide a method of producing an asymmetrical or other article, for example a bicycle pedal crank, whereby the aforementioned disadvantages are avoided.

Thus according to the present invention a method of producing an asymmetrical or other article, for example a bicycle pedal crank, comprises the steps of producing a preform of a suitable shape having regard to the intended end product and coining such preform between open dies thereby to impart a positive profile to opposite faces of the preform whilst allowing the regions between such faces to take up a natural form without restraint from the said dies. Nevertheless local restraint can be imposed if necessary to give certain accurate dimensions to the coined part.

The initial preform may be a volume of revolution produced by turning or alternatively may have any other shape and be formed by any conventional method.

We have found that, contrary to expectation, the surfaces of the preform lying in the space between the dies assume very regular forms and that little or no apparent distortion of the preform takes place in these regions. If the space between the dies were to assume other than the regular form actually obtained, then a machining operation would be required to avoid an unsatisfactory appearance of the finished article, such additional operation detracting, to a limited degree, from the advantages present in the method now proposed.

The invention will now be described further, by way of example only, with reference to the accompanying diagrammatic drawing which illustrate the production of a bicycle pedal crank, and in which:

FIGS. 1 to 3 show various stages in the production of the preform;

FIGS. 1a to 3a are end elevations respectively corresponding to FIGS. 1 to 3;

FIG. 4 is a side elevation of the preform of FIG. 3 after coining;

FIG. 4a is an end elevation corresponding to FIG. 4;

FIG. 5 is a plan view of the body shown in FIG. 4; and

FIG. 6 is a longitudinal section along line VI—VI of FIG. 5, a chain wheel being shown in position upon the crank.

Referring now to the drawings, and particularly to FIG. 1 thereof, a cylindrical slug 11 is cropped from wire or bar of less diameter than the finished preform and such slug 11 is headed by a standard cold forging process to give a diameter at the large end 11a of approximately one inch in the case of a cycle crank. The headed slug is shown in FIG. 2.

The shank 11b of the resultant blank is swaged and the small end 11c is headed in split dies, to give the body illustrated in FIG. 3.

The body or preform 12 illustrated in FIGS. 3 and 3a is thus obtained which is a body of revolution and which, in so far as its longitudinal dimensions are concerned, corresponds very nearly to the finished product.

Referring now to FIGS. 4 and 4a, the preform is now pressed in open dies (not shown), in order that a desired profile is applied to two opposite faces 12a, 12b, that is to say to the top and bottom faces, whilst the sides 12c are allowed to assume a natural form free from any restraint from the dies. During the pressing operation one cross sectional dimension is reduced by the dies whereas the other dimension is allowed to increase by virtue of the open nature of such dies. The profile imparted, may, if desired, include one or more raised portions 12d by means of which attachment of the pedal crank, when fashioned, to a chain wheel might be facilitated. The dies will, if desired, also introduce depressions 12e at the ends of the crank to correspond to the axle and pedal shaft holes, the depressions 12e reducing the amount of material to be removed by drilling.

It is to be appreciated that the preform will be lubricated for cold forming by such as a conventional phosphate treatment.

After coining to produce the body shown in FIG. 4, the axle and pedal shaft holes 13a, 13b respectively are drilled through and a cotter hole 13c provided. Finally, a chain-wheel 14 is positioned upon or relative to the raised portions 12d and is secured to the crank by conventional welding techniques, the resultant assembly being as shown in FIG. 5.

We have found in practice that a pedal crank produced in the manner aforesaid will possess some or all of the following advantages:

(1) There is a very high percentage material utilisation since the only material which is removed is that from the axle, cotter and pedal shaft holes;

(2) The machining operations are eliminated or reduced to a minimum;

(3) An excellent surface finish is obtained from the cold-working operations;

(4) The physical properties of the end product are enhanced by the cold working;

(5) Since open dies are used for the final cold forming, a comparatively small press could be used;

(6) A component may be produced from wire or bar of a cross-section which is less than that of the finished product; and (7) The final pressing operation will allow of the ready application to the finished article of such identification legends or trademarks as might be required.

The invention is not restricted to the particular features of the embodiment hereinbefore described, since alternatives will readily present themselves to one skilled in the art.

What we claim is:

The method of forming a bicycle crank comprising, utilizing a section of a cylindrical bar of less diameter than the largest diameter of the finished crank, cold forging the bar to provide a large diameter part on one end of it, swaging the bar to form a head on its opposite end, pressing the crank-shaped bar between open dies to provide a desired profile on each of its opposite faces while permitting opposite sides of the bar to unrestrainedly spread out between the open dies to thereby assume an unrestricted formation, thereby reducing the thickness of the bar in one direction while increasing its thickness in a direction at right angles, and utilizing the dies to produce depressions in the enlarged parts of the bar at its opposite ends for the production of axle and pedal shaft holes.

References Cited by the Examiner

UNITED STATES PATENTS

| 110,773 | 1/1871 | Miller | 72—352 |
|---|---|---|---|
| 1,506,802 | 9/1924 | Anderson | 72—377 |
| 1,601,016 | 9/1926 | Carlson | 72—375 |
| 1,611,968 | 12/1926 | Webster | 72—358 |
| 2,774,259 | 12/1956 | Caulkins | 72—377 |

CHARLES W. LANHAM, *Primary Examiner.*

L. A. LARSON, *Assistant Examiner.*